Sept. 8, 1936.  W. A. BRECHT  2,053,419
AXLE GENERATOR DRIVE
Filed Dec. 21, 1932  2 Sheets-Sheet 1
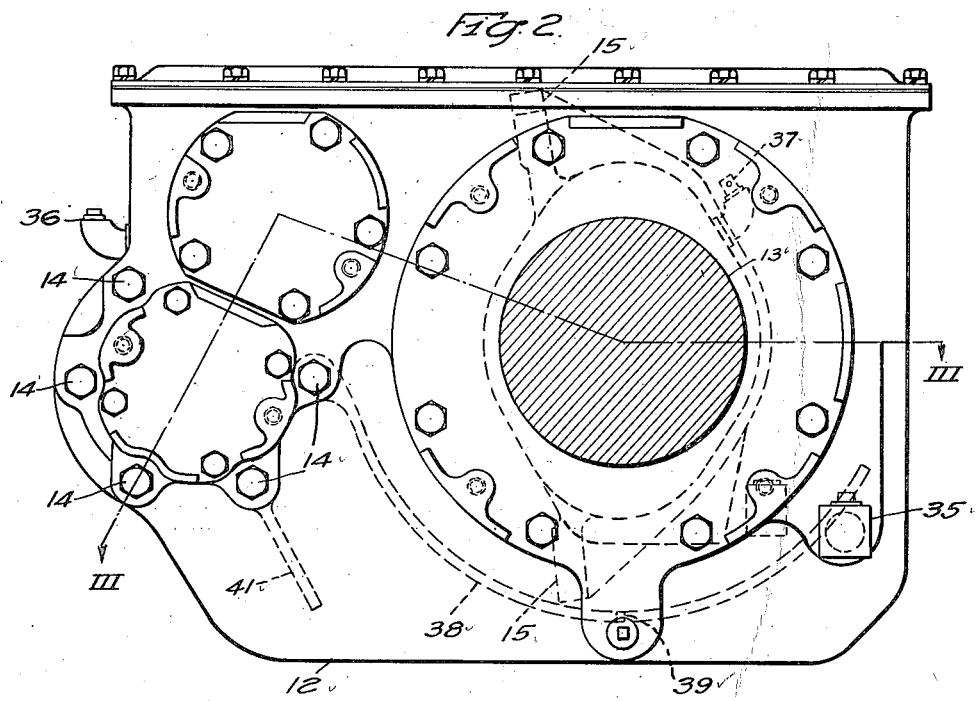
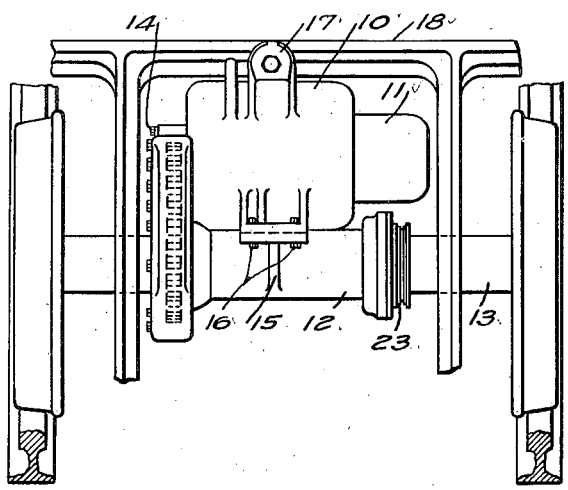
WITNESSES:  INVENTOR
Winston A. Brecht.
BY
ATTORNEY Sept. 8, 1936.  W. A. BRECHT  2,053,419
AXLE GENERATOR DRIVE
Filed Dec. 21, 1932  2 Sheets-Sheet 2
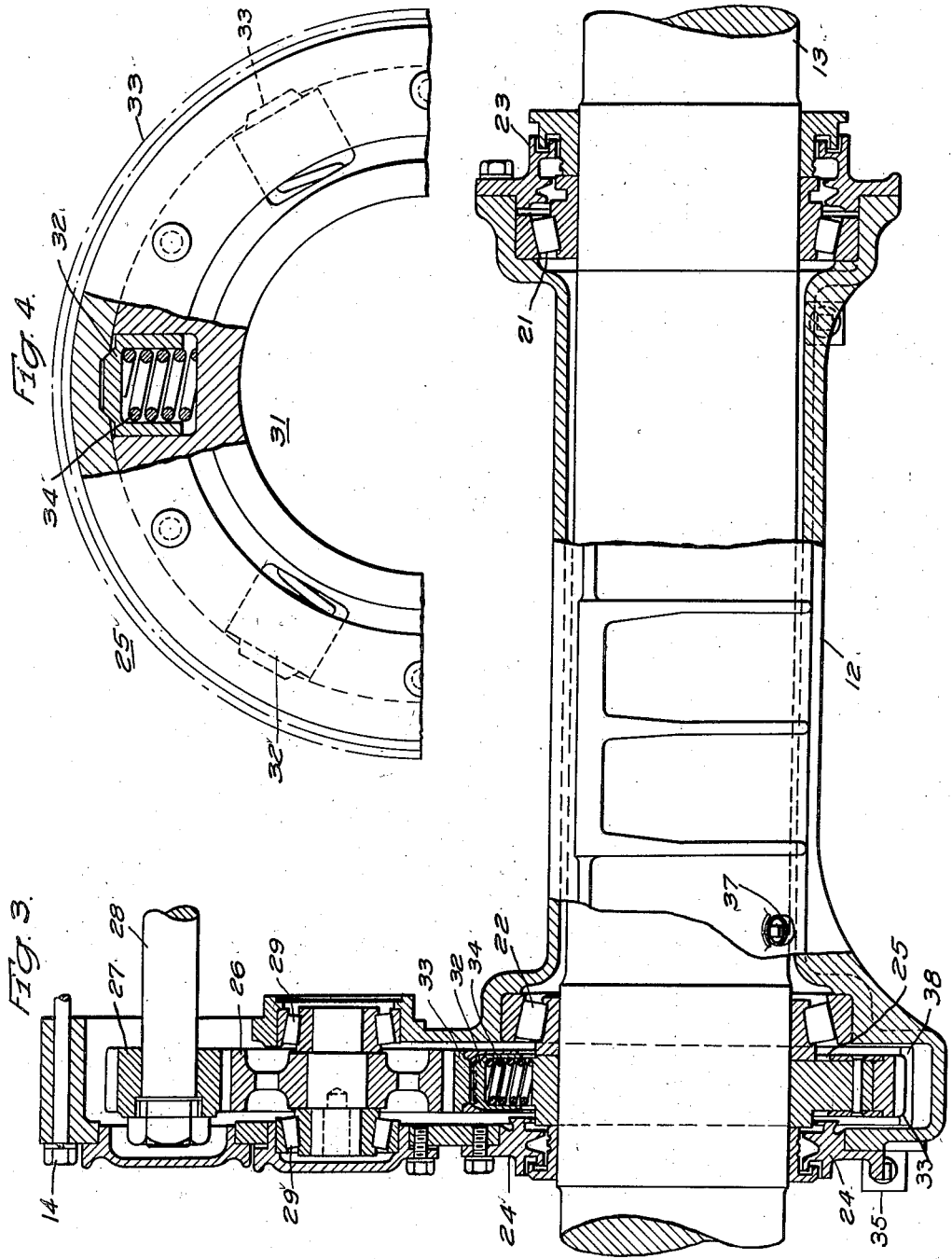
WITNESSES:
INVENTOR
Winston A. Brecht.
BY
ATTORNEY Patented Sept. 8, 1936

2,053,419

UNITED STATES PATENT OFFICE 2,053,419

AXLE-GENERATOR DRIVE

Winston A. Brecht, Pittsburgh, Pa., assignor to Westinghouse Electric & Manufacturing Company, East Pittsburgh, Pa., a corporation of Pennsylvania Application December 21, 1932, Serial No. 648,203

4 Claims. (Cl. 184—13)

My invention relates, generally, to driving mechanisms for railway axle generators, and, more particularly, to mechanisms of the positive or gear-driven type, wherein the generator for supplying energy for operating electrical equipment on a railway car is driven by means of a gear mounted on an axle of the car.

Practically all of the generators now in use on railway cars are driven by means of pulleys mounted on the car axles and belts connecting them with the generators. However, the belt drives have proven generally unsatisfactory, especially since the advent of air-conditioning equipment for use on railway passenger cars, which has greatly increased the load imposed on the electrical system, making it necessary to provide generators of greater capacity. The primary causes of the failure of belt drives are belt slippage and breakage, the belts having such a short life that the cost of replacing them greatly increases the cost of operating cars provided with air-conditioning equipment.

In order to overcome the difficulties encountered with belt-driven axle-generators, gear drives of various types have been developed and tried. However, none of the gear drives heretofore developed have proven of sufficient merit to warrant their adoption by the railway operating companies. The principal reasons why gear drives previously developed have not withstood the severe operating conditions imposed on the driving mechanisms for axle-generators are improper lubrication and the failure to provide a resilient driving mechanism which will reduce the stresses in the gear teeth when the cars are bumped during switching operations. It is also necessary to provide a means for preventing injury to the driving gears in the event that the armature of the generator becomes locked for any reason whatsoever.

An object of my invention, generally stated, is to provide a gear drive for an axle-generator which shall be simple and efficient in operation and which may be readily and economically manufactured and installed.

A more specific object of my invention is to provide for properly lubricating the gears and bearings of an axle-generator driving mechanism.

Another object of my invention is to provide a flexible and resilient driving mechanism for an axle-generator.

Other objects of my invention will be explained fully hereinafter or will be apparent to those skilled in the art.

According to my invention, the generator for supplying energy to operate the electrical equipment on a railway car is driven by a gear that is secured to a car axle. The generator is mounted on a housing which surrounds the axle and encloses the driving gear and the generator pinion gear. A slip clutch is incorporated in the driving gear, thereby preventing injury to the gear teeth as a result of bumping of the car, or in case the generator armature becomes locked. The gears and bearings are lubricated by the splash system, the housing being oil-tight thereby preventing the wasting of oil. Baffle plates are provided inside of the housing for so directing the flow of oil as to prevent an excessive amount of oil being carried into the generator.

For a fuller understanding of the nature and scope of the invention, reference may be had to the following detailed description, taken in conjunction with the accompanying drawings in which:

Figure 1 is a top plan view of a portion of a car truck, showing an axle-driven generator mounted on the housing which encloses the driving gears;

Fig. 2 is a view, in end elevation, of the gear and axle housing;

Fig. 3 is a view, partially in section and partially in elevation, the section being taken along the line III—III in Fig. 2, and Fig. 4 is an enlarged view, partially in elevation and partially in section, of a slip-clutch that is incorporated in the driving gear.

Referring now to the drawings, 10 designates an axle-generator having a "built-in" exciter 11. The generator and exciter may be of the type described in the copending application of C. F. Jenkins, Serial No. 621,161, filed July 7, 1932 and assigned to the Westinghouse Electric and Manufacturing Company, now Patent No. 1,985,679, or a generator of any other type suitable for supplying energy to operate the electrical equipment on a railway car may be utilized.

As shown, the generator is mounted on a housing 12 which surrounds an axle 13 of the car and also encloses the gears which drive the generator. One end of the generator frame is bolted to the gear housing by stud bolts 14 and the side of the frame is mounted on supporting lugs 15 at the top and the bottom of the axle housing by a splined connection and is secured by bolts 16, thereby securely fastening the generator on the axle and gear housing and maintaining the correct alinement of the gears. The torque reaction of the generator is taken care of by a conventional nose suspension 17 which is connected to the truck frame 18 in order to prevent the housing and the generator from rotating about the axle.

The housing 12 is supported on the axle 13 by suitable roller bearings 21 and 22 and, in order that oil may be retained within the housing for lubricating the gears and bearings, the bearings are provided with oil-tight sleeves 23 and 24, as shown in Fig. 3.

The generator 10 is driven by a gear 25 that is secured to the axle 13. In the embodiment of the invention illustrated, an idler gear 26 is interposed between the gear 25 and the generator pinion 27 in order to increase the center distance without increasing the gear diameter. However, it is not necessary to provide the idler gear where it is possible to use a larger driving gear, a smaller generator or a smaller gear reduction. As shown, the pinion 27 is secured to the generator shaft 28 which extends into the gear housing. The idler gear 26 is mounted on roller bearings 29 carried in the gear housing 12.

In order to prevent injury to the gear teeth when the car is bumped during switching operations, a slip clutch 31 is incorporated in the driving gear 25. Since the gear runs in oil, it is impractical to use the friction materials ordinarily provided in frictional clutches. In the preferred embodiment of the invention as shown in Figs. 3 and 4, a plurality of blocks 32 having beveled edges are provided in the gear center and are disposed to be forced out radially into notches in the gear rim 33 by springs 34. By properly proportioning the strength of the springs 34 and the angle of the beveled edges the clutch may be designed to carry normal loads without permitting relative motion between the gear rim and the gear center. Large overloads, such as may result from the car being suddenly bumped or from the armature of the generator becoming locked, will cause the springs 34 to deflect and permit the gear center to rotate with respect to the gear rim, thereby preventing injury to the gear teeth.

While I have illustrated a clutch mechanism of a preferred type, it is apparent that resilient driving mechanisms or automatic releasing devices of other types may be interposed between the generator shaft and the car axle to prevent injury to the equipment.

As previously stated, one of the reasons why the gear drives for axle-generators which have been previously developed have been unsuccessful is the lack of proper lubrication of the gears and the bearings. By enclosing all moving parts of the driving mechanism in the oil-tight housing 12, I am enabled to utilize a splash system of lubrication which ensures that all moving parts will be properly lubricated. The proper level of oil in the housing 12 may be maintained by pouring oil through a filler cap 35 provided in the end of the housing 12. Breather plugs 36 and 37 are provided in the housing to prevent the pressure inside of the housing from rising above atmospheric pressure. When the car is in operation oil is distributed to all moving parts of the driving mechanism by the action of the driving gear 25, the lower edge of which runs in the oil.

In order to prevent an excessive amount of oil being thrown onto the generator pinion 27, from whence it has a tendency to be carried along the shaft 28 into the generator housing by the suction created by the rotating armature of the generator, a curved baffle plate 38 is provided within the gear housing 12. The plate 38 constitutes a partition which divides the gear case 12 into two compartments, the upper compartment containing the gear 25 and the lower one the lubricating oil.

As shown in Fig. 2, a small opening 39 is provided in the lowermost portion of the baffle plate 38 through which the oil may rise to the upper compartment from which it is thrown over the gears and bearings by the action of the gear 25. The oil falls down over the idler gear 26 and the pinion 27 and returns to the lower compartment. In this manner all of the oil that is distributed throughout the mechanism by the gear 25 must flow through the opening 39 and it will be readily understood that the quantity of oil distributed may be controlled by varying the size of the opening 39.

To further prevent the splashing of oil, an additional baffle plate 41 may be provided within the gear housing, as shown in Fig. 2, if desired. As previously stated, the gear housing and bearing sleeves are made as nearly oil-tight as possible thereby preventing the wasting of oil and making it unnecessary to replenish the oil supply except at long intervals of time.

From the foregoing description it is evident that I have developed a simple and efficient gear drive for axle-generators which is provided with the flexibility and resiliency requisite for withstanding the severe operating conditions encountered in railway service and is also provided with a lubricating system which ensures that all moving parts of the driving mechanism will be properly lubricated.

While I have illustrated and described a mechanism for driving an electric generator from a car axle, it will be understood that the mechanism herein described may be readily utilized for driving the axle by an electric motor to propel the car or vehicle.

I do not desire to be restricted to the specific embodiment of my invention herein shown and described, since it is evident that it may be changed and modified without departing from the spirit and scope of my invention as defined in the appended claims.

I claim as my invention:

1. In a generator drive, in combination, a car axle, a driving gear secured to the axle, a housing enclosing the gear and a portion of the axle for supporting a generator, bearings disposed between the housing and the axle, means disposed within the gear housing for dividing it into an upper and a lower compartment, means for introducing oil into one of said compartments, said dividing means having means therein for regulating the flow of oil into the other compartment from which it is distributed wholly within the housing onto the bearings by the action of the driving gear.

2. In a generator drive, in combination, a car axle, a driving gear secured to the axle, a housing enclosing the gear and a portion of the axle for supporting a generator, bearings disposed at each end of the housing for supporting it on the axle, a curved baffle plate disposed within the gear housing for dividing it into an upper and a lower compartment, the upper compartment containing the driving gear, and means for introducing oil into the lower compartment, said baffle plate having an opening disposed to permit oil to rise from the lower compartment into the upper compartment from which it is distributed wholly within the housing onto the bearings by the action of the driving gear.

3. In a gear-drive mechanism, in combination, a vehicle axle, a driving gear secured to the axle, a housing enclosing the gear and a substantial portion of the axle, bearings disposed at each end of the housing for supporting it on the axle, a semi-circular baffle plate disposed within the housing beneath the gear for dividing the housing into an upper and a lower compartment, and means for introducing oil into the lower compartment, said baffle plate having an opening disposed at its lowermost point to permit oil to rise from the lower compartment into the upper compartment from which it is distributed wholly within the housing and onto the bearings by the driving gear.

4. In a drive mechanism, in combination, a vehicle axle, a driving gear secured to the axle, a housing enclosing the gear and a substantial portion of the axle for supporting a generator, anti-friction bearings for supporting the housing on the axle, means for retaining lubricating oil within the housing at a predetermined level, a baffle plate disposed within the housing to divide it into an upper and a lower compartment, said baffle plate having means therein for regulating the flow of oil from the lower compartment into the upper compartment, said driving gear being disposed in the upper compartment to distribute the oil wholly within the housing onto said bearings.

WINSTON A. BRECHT.